United States Patent

Budgell et al.

[11] Patent Number: 5,942,327
[45] Date of Patent: Aug. 24, 1999

[54] SOLVENT-SPUN CELLULOSE FILAMENTS

[75] Inventors: Derek Budgell, Erlenbach; Hans-Juergen Pitowski, Miltenberg; Ulrich Wachsmann, Elsenfeld, all of Germany

[73] Assignee: Akzo Nobel NV, Arnhem, Netherlands

[21] Appl. No.: 08/849,509

[22] PCT Filed: Dec. 7, 1995

[86] PCT No.: PCT/EP95/04808

§ 371 Date: Jun. 19, 1997

§ 102(e) Date: Jun. 19, 1997

[87] PCT Pub. No.: WO96/18760

PCT Pub. Date: Jun. 20, 1996

[30] Foreign Application Priority Data

Dec. 12, 1994 [DE] Germany ............... 44 44 140

[51] Int. Cl.⁶ .................. D02G 3/00; C08B 16/00
[52] U.S. Cl. .................. 428/364; 428/393; 536/56; 536/57
[58] Field of Search .................. 428/364, 393; 536/56, 57

[56] References Cited

U.S. PATENT DOCUMENTS

| | | | |
|---|---|---|---|
| 4,851,522 | 7/1989 | Chanzy et al. | 536/56 |
| 4,880,469 | 11/1989 | Chanzy et al. | 106/203 |
| 5,216,144 | 6/1993 | Eichinger et al. | 536/56 |
| 5,795,522 | 8/1998 | Firgo et al. | 264/187 |

FOREIGN PATENT DOCUMENTS

| | | |
|---|---|---|
| 395 724 | 2/1993 | Austria . |
| 271 534 A1 | 9/1989 | German Dem. Rep. . |

OTHER PUBLICATIONS

Derwent Info. 1997, English language Abstract of DD-271534.

H. Chanzy, M. Paillet and R. Hagege, "Spinning of Cellulose from N–Methyl Morpholine N–Oxide in the Presence of Additives," *Polymer*, Mar. 1990, vol. 31, pp. 400–405.

*Primary Examiner*—Newton Edwards
*Attorney, Agent, or Firm*—Oliff & Berridge, PLC

[57] ABSTRACT

Solvent-spun cellulose filaments from a solution of cellulose in a tertiary amine N-oxide and if necessary water with a strength of 50 to 80 cN/tex, an elongation at break of 6 to 25% and a specific breaking time of at least 300 s/tex.

19 Claims, 2 Drawing Sheets

SOLVENT-SPUN CELLULOSE FILAMENTS

BACKGROUND OF THE INVENTION

The invention relates to solvent-spun cellulose filaments from a solution of cellulose in a tertiary amine N-oxide.

The publication "Spinning of cellulose from N-methylmorpholine-N-oxide in the presence of additives" by H. Chanzy, M. Paillet and R. Hagège (Polymer, 1990 Vol. 31, March, pages 400 to 405) discloses such filaments (fibers) which were manufactured from a solution of cellulose with a degree of polymerization (DP) of 600 or 5000 in the tertiary amine N-oxide N-methylmorpholine-N-oxide (NMMO). Based on the cellulose with a DP of 600, filaments were obtained having a strength of 0.5 GPa corresponding to 33.3 cN/tex and a 16% elongation at break. When cellulose with a DP of 5000 was employed the strength amounted to 56.7 cN/tex (0.85 GPa) and a 4% elongation at break.

By adding 2% ammonium chloride ($NH_4Cl$) to the cellulose solution (DP 600) the strength of the filaments produced thereby increased to 60 cN/tex (0.9 GPa). The elongation at break of these filaments amounted to 8%. Likewise by adding ammonium chloride or calcium chloride to the solutions of the cellulose with a DP of 5000, filaments with high strength were obtained (up to 87 cN/tex), but whose elongation at break was below 5%. The salts added to the solutions ($NH_4Cl$ or $CaCl_2$) were no longer detectable in the filaments. This effect was to be attributed to the process steps which are typical for the production of these filaments: the passage through an aqueous coagulation bath in order to precipitate the cellulose, subsequent to the spinning in an air gap and the washing baths which follow the coagulation bath. The NMMO solvent is removed from the filaments in these baths. Considering the statement in the above mentioned publication that the salts were no longer detectable in the filaments, it is to be assumed that the salts were washed out of the filaments during these treatment steps.

The solvent spinning process with a tertiary amine N-oxide as a solvent for the cellulose is characterized by its pronounced environmental acceptability since the solvent washed out of the filaments can be nearly completely recovered and be used again in preparing the solution. In respect to an economical way of carrying out the process, the addition of salts to the spinning solution is therefore disadvantageous since the recovery of the tertiary amine N-oxide, which is achieved in general with ion exchangers, becomes considerably more difficult since the resins in the ion exchangers are saturated by the ions of the salts instead of the desired degradation products of the cellulose and the amine N-oxide, which are present in the wash water in addition to the tertiary amine N-oxide. Moreover chlorides lead to corrosion of installation parts made of steel.

Besides these process-related disadvantages of adding salts to the cellulose solution, the resulting filaments also exhibit considerable disadvantages regardless of their high strength. As explained in the above mentioned publication, adding salts influences greatly the internal morphology of the filaments. In this case not only was a modification of the internal structure discovered, but also a reduction was found in the lateral cohesion compared to filaments which were produced without adding salts. Based on this fact each rubbing, bending or repetitive handling leads to a significant delamination of the filaments with a release of microfibrillar lint, which is also called fibrillation. This extremely pronounced fibrillation was not observed with filaments produced without adding salts to the spinning solution. Based on this characteristic, filaments produced under the addition of salts to the spinning solution are in general not suited for a textile application.

SUMMARY OF THE INVENTION

The present invention was therefore based on the objective to provide other solvent-spun cellulose filaments from a solution of cellulose in a tertiary amine N-oxide, which moreover can be manufactured in an economical way. A further objective of the present invention was to provide solvent-spun cellulose filaments from a solution of cellulose in a tertiary amine N-oxide which are particularly suited for industrial usage.

This objective is met by solvent-spun cellulose filaments from a solution of cellulose in a tertiary amine N-oxide and, if necessary, water with a strength ranging between 50 and 80 cN/tex, a 6 to 25% elongation at break and a specific breaking time of at least 300 s/tex.

DETAILED DESCRIPTION OF PREFERRED EMBODIMENTS

The strength of the filaments amounts preferably to 50 to 70 cN/tex, in particular 53 to 66 CN/tex, and their elongation at break ranges between 6 and 20%, in particular 6 to 13%. Specific breaking times of 300 to 2000 s/tex, for example 300 to 1000 s/tex or 304 to 767 s/tex, can be obtained without problems. The cellulose which is dissolved in the tertiary amine N-oxide is preferably southern pine chemical wood pulp.

According to the prior art described by the aforementioned publication, filaments are known to exhibit a strength of 33.3 cN/tex and a 16% elongation at break (DP 600) or 56.7 cN/tex with a 4% elongation at break (DP 5000). By adding $NH_4Cl$, filaments are obtained which demonstrate a strength of 60 cN/tex with an 8% elongation at break (DP 600) and which, due to the modification of the morphology, exhibit a very pronounced fibrillation.

Surprisingly it was found that filaments also exist which demonstrate a high strength (50 to 80 cN/tex) and a 6 to 25% elongation at break and which, compared to filaments with normal values of strength and elongation for textile applications, do not have a modified morphology and demonstrate therefore a fibrillation similar to that of filaments suited for textile applications, or their fibrillation is even less pronounced than that of the latter filaments.

Figure 1:
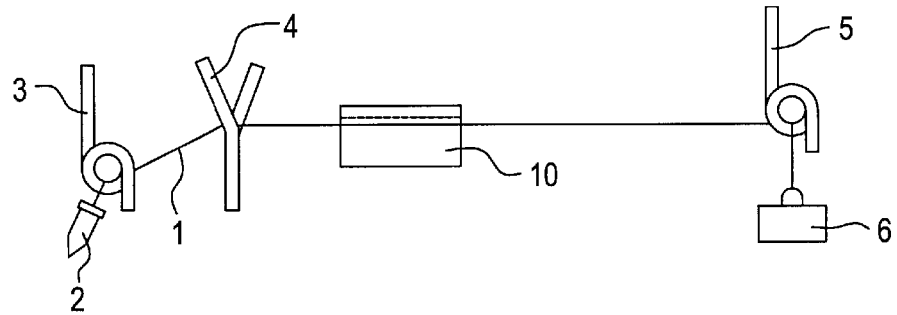
FIG. 1 depicts a schematic of a set up used for measuring breaking time.

One measure of the fibrillation tendency is the specific breaking time represented as s/tex. The higher the value of this quantity, the less pronounced the fibrillation of the filament. For measuring the breaking time, as depicted in FIG. 1, a bundle 1 made up of 50 filaments and secured at one end with a thread clamp 2 is guided through a thread guide 3. The bundle 1 is oriented with a Y piece 4 in relation to an ejector 10. The ejector 10 is followed by a thread guide 5 by which a deflection of the bundle 1 takes place, the bundle being weighted at its other end with a weight 6 of 20 grams. The distance between the first thread guide 3 and the Y piece 4, as well as between the Y piece 4 and the entrance of the ejector, is approx. 3 cm. The distance between ejector exit and the second thread guide 5 is approx. 11 cm. The ejector 10 is 22 mm long.

Figure 2:
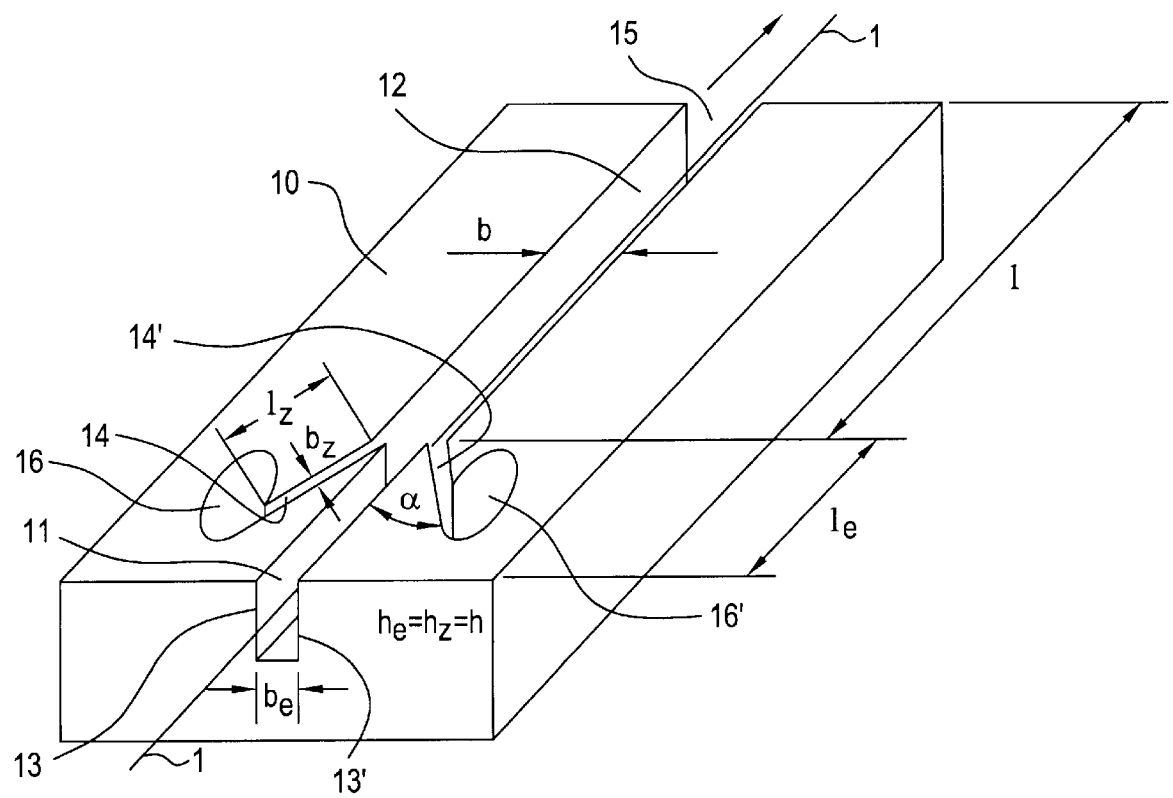
FIG. 2 is a perspective view of ejector 10 of FIG. 1.

According to the perspective depicted in FIG. 2, the ejector 10 exhibits an entrance slit 11 for bundle 1 with a square cross-section. The width $b_e$ and the height $h_e$ of the entrance slit 11 are 1 mm. The thread channel 12, which extends through the entire ejector 10, exhibits at a distance $l_e$ of 8 mm from the entrance slit 11 in both side walls 13 and 13' liquid feeding ducts 14 and 14' which are facing each other. Water at a temperature of approx. 25° C. streams through these feeding ducts 14 and 14' at an angle α of 15° relative to the axis of the bundle 1. The water flows at a rate totaling 45 l/h into the thread channel 12 and exits the ejector 10 at exit slit 15. The width $b_z$ of the liquid feeding ducts 14 and 14' is 0.6 mm and their height $h_z$ is 1 mm. The length $l_z$ of the feeding ducts 14 and 14' is 6 mm. The width of the thread channel 12 from the junction of the liquid feeding ducts 14 and 14' up to the exit slit 15 is 1.2 mm. The height h is 1 mm. Feeding with water takes place via bores 16 and 16' with a diameter of 4 mm from the underside of the ejector 10. The ejector 10 is closed off from above by a cover, not depicted, resting flatly on the ejector.

To determine the breaking time, the filament bundle 1 is inserted into the apparatus according to FIG. 1 and the weight is applied. The conduction of water into the ejector 10 represents the beginning of the time measurement. The time measurement ends when the weight falls, i.e. when the bundle tears. Ten individual measurements were carried out for each example, and the data stated for the breaking time represent the mean values of these 10 measurements. For standardization, the time measured is related to the filament titer (specific breaking time in s/tex).

The strength and elongation were determined using the strength-elongation behavior of single filaments under climatized conditions (T=21+4/−2° C.), relative humidity (65±5%) with the Fafegraph test device (Textechno). The clamping length amounted to 20 mm and the test speed was 20 mm/min. based on an initial tension of 1 cN/tex. The Fafegraph has pneumatic clamps made of hard rubber/Vulkollan with an area of approx. 4 mm×6 mm. Immediately before the elongation test, a fineness measurement was carried out on each filament using a Vibromat device (Textechno), so that the tensile test data of a filament were related to the fineness of this filament. For the Vibromat the fineness-related initial tension amounted also to 1 cN/tex.

The further object of the invention, to provide other solvent-spun cellulose filaments from a solution of cellulose in a tertiary amine N-oxide which are in particular suited for industrial usage, is especially met by solvent-spun cellulose filaments from a solution of cellulose in a tertiary amine N-oxide and if necessary water, with a strength ranging from 50 to 80 cN/tex and an elongation at break ranging from 9 to 25%.

The filaments preferably exhibit a 9.5 to 21% elongation at break, and more particularly 9.7 to 13%. It is favorable if the specific breaking time of the filaments of the invention amounts to at least 300 s/tex. Specific breaking times from 300 to 2000 s/tex, for instance from 370 to 1000 s/tex, can be obtained without problems.

Also, the filaments of the invention are characterized in that the cellulose is a southern pine chemical wood pulp.

The invention will be explained and described in the following in further detail with reference to examples.

EXAMPLES

Solvent-spun cellulose filaments were manufactured using a solution of cellulose in the tertiary amine N-oxide NMMO and water, to which gallic acid propyl ester was added as a stabilizer and which was extruded through a spinneret disc plate with 50 nozzle bores.

In examples 1 to 9 the southern pine chemical wood pulp Ultranier-J (ITT-Rayonier) with a degree of polymerization (DP) of 1360 was employed. For comparison, in example 10, which represents filaments known in common textile applications, the chemical wood pulp Viscokraft VHV (International Paper Company), a pre-hydrolysis kraft pulp from hardwoods with a DP of 1667, was employed.

After leaving the spinneret the filaments were cooled, in an air gap spanning 17.5 cm, by air flowing with a velocity of 0.8 m/s at a right angle to the filaments. The cellulose was precipitated in an aqueous coagulation bath 40 mm deep and directed through a washing zone to remove NMMO. The excess finishing agent (2% K 7451 in water, distributed by Stockhausen GmbH, Krefeld, Germany), applied after the washing, was stripped off the filaments in a squeezing step between two rollers. Subsequently the filaments were dried and wound up.

Figure 3:
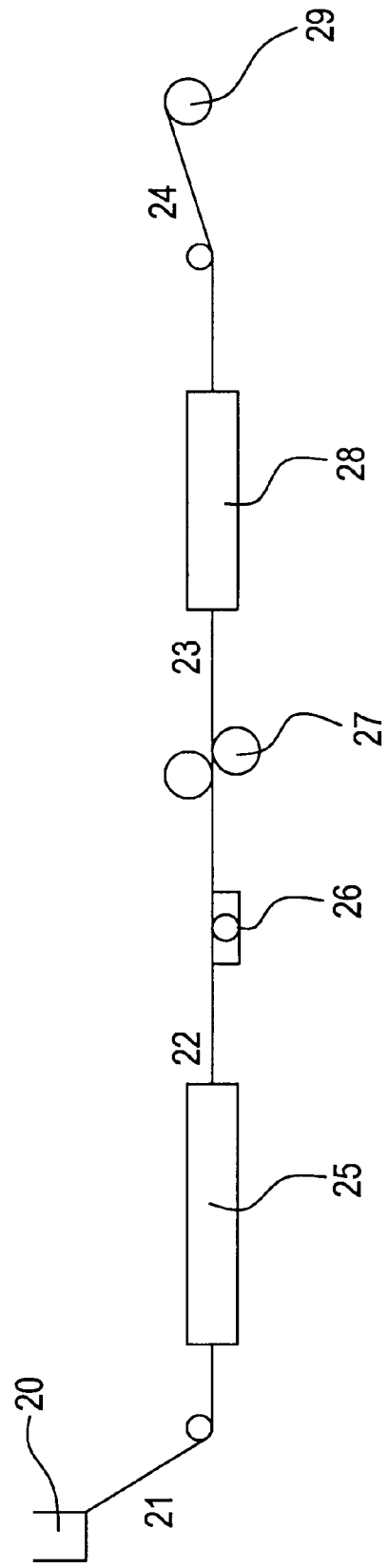
FIG. 3 is a schematic for the measurement of filament tension.

After the filaments had exited the coagulation bath, the filament tension was determined at several positions. These positions are schematically depicted in FIG. 3:

position 21: between the coagulation bath 20 and the wash zone 25 position 22: between the wash zone 25 and the application of finishing agent 26 position 23: between the squeezing step 27 and the drying zone 28 position 24: prior to being wound up 29.

The filament tension was measured with the Tensiomin measuring device Bn 135.205.2 and the measuring sensor 100 cN type Bn 125.126.1 (Kurt Honigmann).

The further test conditions and properties of the filaments obtained according to examples 1 to 9 and the comparison example 10 are summarized in table I.

TABLE I

| Examples | 1 | 2 | 3 | 4 | 5 | 6 | 7 | 8 | 9 | 10 |
| --- | --- | --- | --- | --- | --- | --- | --- | --- | --- | --- |
| Degree of polymerization DP | 1360 | 1360 | 1360 | 1360 | 1360 | 1360 | 1360 | 1360 | 1360 | 1667 |
| Cellulose content c/% by weight | 12.0 | 12.0 | 12.0 | 12.0 | 12.8 | 12.4 | 12.4 | 13.0 | 13.0 | 9.8 |
| Water content/% by weight | 10.5 | 10.5 | 10.5 | 10.5 | 9.9 | 10.4 | 10.4 | 10.0 | 10.0 | 11.5 |
| NMMO content/% by weight | 77.46 | 77.46 | 77.46 | 77.46 | 77.17 | 77.16 | 77.16 | 76.96 | 76.96 | 78.6 |
| Stabilizer content/% by weight | 0.04 | 0.04 | 0.04 | 0.04 | 0.13 | 0.04 | 0.04 | 0.04 | 0.04 | 0.1 |
| Spinning temperature/° C. | 112 | 112 | 112 | 112 | 119 | 120 | 120 | 118 | 120 | 112 |
| Nozzle orifice diameter/μm | 200 | 200 | 200 | 200 | 200 | 130 | 130 | 130 | 130 | 130 |

TABLE I-continued

| Examples | 1 | 2 | 3 | 4 | 5 | 6 | 7 | 8 | 9 | 10 |
|---|---|---|---|---|---|---|---|---|---|---|
| Air gap temperature/° C. | 37 | 37 | 37 | 37 | 24 | 25 | 25 | 10 | 37 | 16 |
| Rel. humidity/% | 19.3 | 19.3 | 19.3 | 19.3 | 9.8 | 8.2 | 8.2 | 12.6 | 10.0 | 10.0 |
| Temperature of the coagulation bath/° C. | 11 | 12 | 12 | 13 | 30 | 30 | 30 | 9 | 11 | 30 |
| Filament tension/cN | | | | | | | | | | |
| Position 21 | 28 | 40 | 30 | 38 | 40 | 36 | 36 | 33 | 38 | 28 |
| Position 22 | 12 | 25 | 14 | 22 | 40 | 17 | 15 | 10 | 16 | 17 |
| Position 23 | 5 | 8 | 79 | 88 | 34 | 82 | 34 | 79 | 84 | 6 |
| Position 24 | 8 | 10 | 88 | 90 | 36 | 91 | 36 | 88 | 93 | 11 |
| Winding up speed w/(m/min.) | 420 | 420 | 420 | 420 | 175 | 350 | 175 | 350 | 258 | 420 |
| $K = DP^{0.5} \cdot (c/\%) \cdot (w/(m/min.))^{0.075}$ | 281 | 281 | 281 | 281 | 320 | 295 | 310 | 309 | 316 | 254 |
| Filament titer/dtex | 1.47 | 1.49 | 1.95 | 1.64 | 1.61 | 1.57 | 1.59 | 1.51 | 1.57 | 1.36 |
| Strength/(cN/tex) | 53.2 | 53.8 | 58.6 | 65.6 | 53.3 | 52.7 | 53.9 | 55.6 | 57.1 | 43.8 |
| Elongation at break/% | 13.0 | 9.7 | 7.4 | 6.3 | 9.0 | 7.3 | 9.0 | 8.2 | 7.9 | 8.9 |
| Spec. breaking time/(s/tex) | 374 | 370 | 304 | 335 | 621 | 369 | 767 | 444 | 634 | 257 |

In two further examples solvent-spun cellulose filaments were produced via a spinneret which only had a nozzle bore with a diameter of 130 μm. The spinning temperature amounted to 100° C. The filaments were cooled in an air gap spanning 15 cm by means of immobile air at a temperature of 25° C. Subsequent to the coagulation bath maintained at 18° C., the filaments were washed, treated with a finishing agent (1% Leomin in water, distributed by Hoechst AG), and dried. Between the spinneret and the winding up a drawing ratio of 1:13 was adjusted. The spinning speed amounted to 48 m/min. In order to determine the specific breaking time, bundles of 50 individual filaments were produced from the continuous filaments.

In example 11, as in examples 1 to 9, the chemical wood pulp Ultranier-J (DP 1360) was employed. The solution exhibited a cellulose concentration of 10 per cent by weight, 11.5 per cent water by weight and 78.4 per cent NMMO by weight. The concentration of gallic propyl ester amounted to 0.1 per cent by weight.

For the production of filaments according to example 12 (comparison example) Viscokraft 4.3 from the International Paper Company with a degree of polymerization of 650 in a concentration of 12.7 per cent by weight was employed as a chemical wood pulp. The water concentration amounted to 9.0 per cent by weight. 78.2 per cent NMMO by weight and 0.1 per cent gallic acid propyl ester by weight were present. The properties of the filaments produced according to example 11 and the comparison example 12 are shown in table II.

TABLE II

| Example | 11 | 12 |
|---|---|---|
| Filament titer/dtex | 1.2 | 1.8 |
| Strength/ (cN/tex) | 52.8 | 36.4 |
| Elongation at break/% | 13.0 | 11.7 |
| Specific breaking time/ (s/tex) | 1000 | 250 |

The tables I and II show clearly that the filaments exhibit according to the comparison examples 10 and 12 a specific breaking time of 257 and 250 s/tex, respectively. The strength of the filaments of 43.8 and 36.4 cN/tex and their elongation at break of 8.9 and 11.7%, respectively, lie in a range which is normal for solvent-spun cellulose filaments for textile applications. Surprisingly, the filaments of the invention (examples 1 to 9 and 11) exhibit a high strength, with an elongation at break which is comparable to the one of the comparison examples 10 and 12. In particular they do not exhibit the disadvantage of the very pronounced fibrillation observed in the prior art cited. On the contrary, the filaments of the invention exhibit a clearly reduced tendency toward fibrillation (up to a factor of 4) compared to the filaments of the comparison examples. The filaments of the invention therefore combine a high strength which is desired for industrial areas of application and a decreased tendency toward fibrillation, making those filaments also very suited for textile applications.

Additionally, the filaments of the invention can be economically produced and the disadvantages for obtaining high strength in the prior art, such as the addition of salts to the cellulose solution, can be advantageously avoided. For the manufacture of the filaments of the invention the degree of polymerization of the cellulose employed in the production of the solution, and the concentration of the cellulose, is decisive on the one hand, as well as the winding speed of the filaments on the other hand. To produce filaments of the invention, the degree of polymerization DP, the cellulose concentration c in %, and the winding speed w in m/min are adjusted so that the size K, which depends on these three values and whose value is calculated according to the following equation:

$$K = DP^{0.5} \cdot c \cdot w^{-0.075}$$

exceeds 259. The values of K are stated for examples 1 to 10 in table I. For the example 11 of the invention this value is 276, whereas its value is only 229 for the comparison example 12.

Furthermore for the manufacture of the filaments of the invention the following process parameters are also important. In order to obtain the highest strength possible, the chemical wood pulp employed in the production of the solution should contain a percentage of α-cellulose as high as possible, such as the chemical wood pulp of southern pine employed in examples 1 to 9 and 11. For example, during the manufacture of filaments according to example 10, using a chemical wood pulp with a higher DP than the DP of southern pine chemical wood pulp, the desired strength could not be obtained.

Besides these influencing quantities, the temperature of the coagulation bath and the filament tension at position 23, i.e. in the drying zone 28, likewise influence the strength.

It was found that the temperature of the coagulation bath should be as low as possible to obtain high strength. In examples 5, 6 and 7, where the coagulation bath temperature amounted to 30° C., the resulting strengths were 53.3, 52.7 and 53.9 cN/tex respectively. In example 3, despite a lower cellulose concentration, the resulting strength amounted to 58.6 cN/tex with a coagulation bath temperature of 12° C.

By increasing the filament tension at position 23 an increase in the strength can likewise be obtained. As the examples 2 and 3 illustrate, the strength of the filaments can be raised via the increase of filament tension at position 23 while all other test conditions are approximately comparable. High strength filaments can also be obtained if a low temperature of the coagulation bath is chosen and a high filament tension is applied at position 23 as the examples 3, 4 and 9 show. In contrast, in example 6 where a filament tension on the same order as in examples 3, 4 and 9 was likewise applied, but with a significantly higher coagulation bath temperature, the resulting strength of the filaments was low.

The elongation at break, conversely, decreases due to the increase of the filament tension at position 23. Additionally it was found that an increase in the elongation at break can be obtained by reducing the filament tension in the area of the washing zone and prior to the application of the finishing agent (position 22). According to example 1 the elongation at break of the filaments amounts to 13%, whereby the filament tension was 12 cN at position 22, and 5 cN at position 23. In contrast to that, example 8 resulted in an 8.2% elongation at break. At position 22 the filament tension was however only 10 cN, but at position 23 a filament tension of 79 cN was applied.

We claim:

1. Solvent-spun cellulose filaments made from a solution comprising cellulose in a tertiary amine N-oxide and optionally water wherein said filaments have a strength from 50 to 80 cN/tex, an elongation at break from 6 to 25% and a specific breaking time of at least 300 s/tex and wherein said solution is substantially free of salts.

2. The filaments of claim 1, wherein said elongation at break is from 6 to 20%.

3. The filaments of claim 1, wherein said strength is from 53 to 66 cN/tex and said elongation at break is from 6 to 13%.

4. The filaments of claim 1, wherein said elongation at break is from 6 to 9.7%.

5. The filaments of claim 1, wherein said elongation at break is from 6 to 9.5%.

6. The filaments of claim 1, wherein said elongation at break is from 6 to 9%.

7. The filaments of claim 1, wherein said cellulose is a southern pine chemical wood pulp.

8. Solvent-spun cellulose filaments made from a solution comprising cellulose in a tertiary amine N-oxide and optionally water wherein said filaments have a strength from 50 to 80 cN/tex and an elongation at break from 9 to 25%, and wherein said solution is substantially free of salts.

9. The filaments of claim 8, wherein said elongation at break is from 9.5 to 21%.

10. The filaments of claim 8, wherein said elongation at break is from 9.7 to 13%.

11. The filaments of claim 8, wherein said filaments have a specific breaking time of at least 300 s/tex.

12. The filaments of claim 8, wherein said cellulose is a southern pine chemical wood pulp.

13. Solvent-spun cellulose filaments made from a solution consisting essentially of cellulose in a tertiary amine N-oxide, an optional stabilizer and optionally water, wherein said filaments have a strength from about 50 to about 80 cN/tex, an elongation at break from about 6 to about 25% and a specific breaking time of at least 300 s/tex.

14. The filaments of claim 13, wherein said elnogation at break is from about 9 to about 25%.

15. The filaments of claim 13, wherein said solution consists of cellulose in a tertiary amine N-oxide and optionally water.

16. The filaments of claim 8, wherein said salts comprise chloride salts.

17. The filaments of claim 16, wherein said chloride salts are selected from the group consisting of $NH_4Cl$, $CaCl_2$ and mixtures thereof.

18. Solvent-spun cellulose filaments made from a solution comprising cellulose in a tertiary amine N-oxide and optionally water wherein said filaments have a strength from 50 to 80 cN/tex, an elongation at break from 6 to 25% and a specific breaking time of at least 300 s/tex and wherein said solution is substantially free of $NH_4Cl$ or $CaCl_2$.

19. The filaments of claim 18, wherein said solution is substantially free of chloride salts.

* * * * *

UNITED STATES PATENT AND TRADEMARK OFFICE
CERTIFICATE OF CORRECTION

PATENT NO. : 5,942,327
DATED : August 24, 1999
INVENTOR(S) : Derek BUDGELL; Hans-Juergen PITOWSKI; and Ulrich WACHSMANN It is certified that error appears in the above-indentified patent and that said Letters Patent is hereby corrected as shown below:

Title page, in item [86],    line 2, § 371 Date:, change "June 19, 1997" to --June 5, 1997--; and line 3, § 102(e) Date:, change "June 19, 1997" to --June 5, 1997--.

Column 6,      line 44, change " $K=DP^{0.5} \cdot c \cdot w^{-0.075}$ " to -- $K=DP^{0.5} \cdot c \cdot w^{0.075}$ --.

Signed and Sealed this

Twenty-fifth Day of April, 2000

Attest:

Q. TODD DICKINSON

*Attesting Officer*             *Director of Patents and Trademarks*